UNITED STATES PATENT OFFICE.

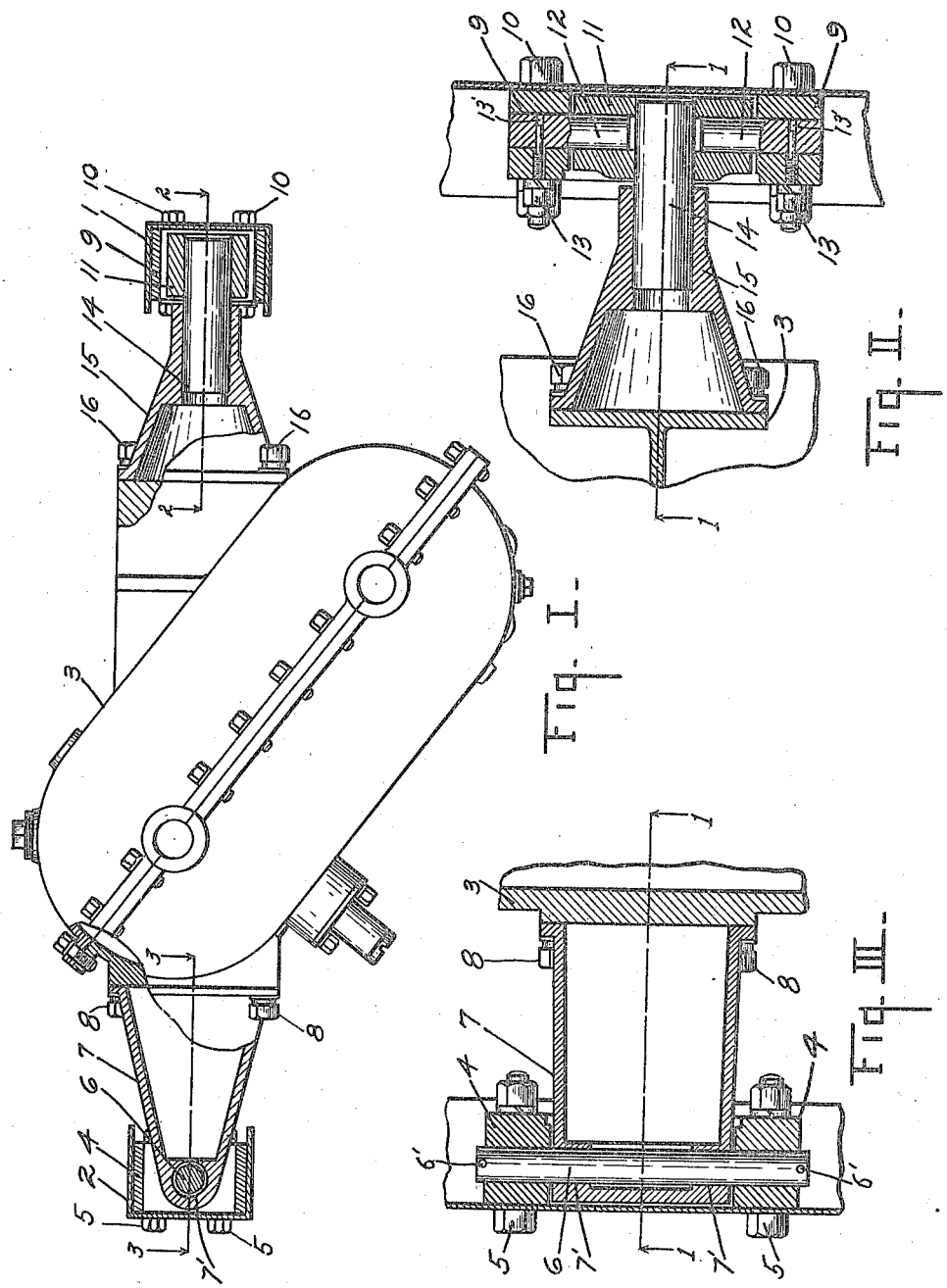

HOWARD M. LEONARD, OF JACKSON, MICHIGAN.

GEAR-CASE MOUNTING FOR MOTOR-VEHICLES.

1,254,708.   Specification of Letters Patent.   Patented Jan. 29, 1918.

Application filed March 27, 1917. Serial No. 157,850.

*To all whom it may concern:*

Be it known that I, HOWARD M. LEONARD, a citizen of the United States, residing at Jackson, county of Jackson, State of Michigan, have invented certain new and useful Improvements in Gear-Case Mountings for Motor-Vehicles, of which the following is a specification.

This invention relates to improvements in gear case mountings for motor vehicles.

The main object of this invention is to provide a motor vehicle transmission or gear case mounting which permits longitudinal and transverse vibrations of the chassis or supporting frame without injury or distortion to the transmission.

Further objects, and objects relating to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a front elevation showing my improved transmission mounting with the mounting supports shown in section on line 1—1 of Figs. II and III.

Fig. II is an enlarged detail horizontal section on line 2—2 of Fig. I.

Fig. III is an enlarged detail horizontal section on line 3—3 of Fig. I.

In the drawing, similar reference numerals refer to similar parts throughout the several views, and the sectional views are taken looking in the direction of the little arrows at the ends of the section lines.

Referring to the drawing, 1 and 2 designate the right and left hand side members of a motor vehicle chasis or running gear frame. 3 represents a transmission case disposed between these frame members, details of the gearing and the shaft connections to the gearing not being illustrated as such details form no part of my present invention.

The structure illustrated is a four wheel drive transmission and the subject matter of a co-pending application, filed by me.

The channeled side bars are disposed to face inwardly. In the channel of the side bar 2 I arrange a pivot block 4 which is secured in place by the bolts 5 (see Figs. I and III).

In the other side bar I secure a pivot block 9 which is secured in place by the bolts 10.

The pivot block 4 carries the longitudinally disposed pivot 6 for the gear case hanger or supporting bracket 7, which is secured to one side of the case 3 by the bolts 8 and is provided with a bearing 7' for the pivot (see Figs. I and III). The pivot 6 is retained by the pins 6' arranged through its ends (see Fig. III).

The pivot block 9 is provided with a pair of journal block pivots 12 for the journal block 11 (see Fig. II). These pivots 12 are secured in place by means of the threaded retaining pins 13 which engage holes 13' in the pivots.

The transverse hanger pivot 14 is carried by the journal block 11 and engages the hanger gear case or supporting bracket 15 which is secured to the gear case 3 opposite to the hanger 7 by means of the bolts 16.

With the transmission or gear case thus supported the strains on the chassis frame, such as occur in use, causing springing, twisting and vibration thereof, are not imparted to the transmission and shafting, which is a feature of very great advantage. Further, this mounting, to a considerable degree, avoids the necessity of great skill and care in the assembling of the parts.

My improved mounting is quite simple and economical to produce and assemble.

I have not attempted in the accompanying drawings to maintain the relative proportion of the parts and certain parts are shown conventionally only and merely to show their coacting relation.

I have not illustrated or described certain modifications in structural details which I contemplate and which may be desirable under certain conditions or to adapt my improvements to various assemblies in which it may be used, as I believe the disclosure made will enable those skilled in the art to embody or adapt the same as may be desired.

Having thus described my invention, what I claim as new and desire to secure by Letters Patent, is:

1. In a structure of the class described, the combination of a pair of channeled side bars disposed facing inwardly, a transmission case, oppositely disposed pivot blocks secured in said side bars, a longitudinally disposed hanger pivot carried by one of said pivot blocks and a pair of longitudinally disposed trunnion block pivots carried by the other pivot block, a trunnion block mounted on said trunnion block pivots, a transverse hanger pivot carried by said trunnion block, and hangers mounted on opposite sides of said transmission case, one of said hangers being mounted on said longitudinal hanger pivot and the other on said transverse hanger pivot.

2. In a structure of the class described, the combination of a pair of side bars, a transmission case, oppositely disposed pivot blocks mounted on said side bars, a longitudinally disposed hanger pivot carried by one of said pivot blocks and a pair of longitudinally disposed trunnion block pivots carried by the other pivot block, a trunnion block mounted on said trunnion block pivots, a transverse hanger pivot carried by said trunnion block, and hangers mounted on opposite sides of said transmission case, one of said hangers being mounted on said longitudinal hanger pivot and the other on said transverse hanger pivot.

3. In a structure of the class described, the combination of a pair of spaced supporting bars, a transmission case disposed between said bars, pivot blocks mounted on said bars, a longitudinally disposed hanger pivot carried by one of said blocks and a longitudinally disposed trunnion block pivot carried by the other pivot block, a trunnion block mounted on said trunnion block pivot, a transverse hanger pivot carried by said trunnion block, and transmission case hangers, one of said hangers being mounted on said longitudinal hanger pivot and the other on said transverse hanger pivot.

4. In a structure of the class described, the combination of a pair of spaced supporting bars, a transmission case disposed between said bars, a longitudinally disposed hanger pivot carried by one of said bars and a longitudinally disposed trunnion block pivot carried by the other bar, a trunnion block mounted on said trunnion block pivot, a transverse hanger pivot carried by said trunnion block, and transmission case hangers, one of said hangers being mounted on said longitudinal hanger pivot and the other on said transverse hanger pivot.

5. In a structure of the class described, the combination of spaced supporting bars, pivot blocks mounted on said bars, a transmission case, a longitudinal pivotal connection connecting one end of said case to one of said pivot blocks and a combined longitudinal and transverse pivot connection connecting the other end of said transmission case to the other pivot block.

6. In a structure of the class described, the combination of spaced longitudinal frame supports, a transmission case, a longitudinal pivotal connection connecting one end of said case to one of said supports and a combined longitudinal and transverse pivot connection connecting the other end of said transmission case to the other of said supports.

In witness whereof, I have hereunto set my hand and seal in the presence of two witnesses.

HOWARD M. LEONARD. [L. S.]

Witnesses:
 LUELLA G. GREENFIELD,
 MARGARET L. GLASGOW.

Copies of this patent may be obtained for five cents each, by addressing the "Commissioner of Patents, Washington, D. C."